United States Patent
Zheng

(10) Patent No.: US 6,347,170 B1
(45) Date of Patent: Feb. 12, 2002

(54) LOW-COST WAVELENGTH DIVISION MULTIPLEXED (WDM) COUPLER WITH MORE FLEXIBLE AND PRECISE OPTICAL FAITH ADJUSTMENT

(75) Inventor: Yu Zheng, Sunnyvale, CA (US)

(73) Assignee: JDS Uniphase, Inc., Ontario (CA)

( * ) Notice: Subject to any disclaimer, the term of this patent is extended or adjusted under 35 U.S.C. 154(b) by 0 days.

(21) Appl. No.: 09/306,373

(22) Filed: May 6, 1999

(51) Int. Cl.[7] .................................................. G02B 6/32

(52) U.S. Cl. .............................. 385/34; 385/16; 385/74

(58) Field of Search ............................. 385/16, 17, 24, 385/27, 14, 43, 39, 47, 74, 88, 89, 90, 92, 93, 147

Primary Examiner—Akm E. Ullah
(74) Attorney, Agent, or Firm—Bo-In Lin

(57) ABSTRACT

The present invention discloses an improved wavelength division multiplexed (WDM) coupler. The WDM coupler includes a WDM filter attached to a first GRIN lens by applying a first heat-curing epoxy. The WDM coupler further includes the first GRIN lens inserted and fixed into a first holding tube by applying a second heat-curing epoxy. The WDM coupler further includes a second holding tube holding a dual fiber pigtail. The dual fiber pigtail is disposed at a first optimal position from the first GRIN lens to achieve a lowest reflection loss with the first and second holding tubes being in contact with each other. The dual fiber pigtail and the first and second holding tubes are fixed together by applying a third heat-curing epoxy. The WDM coupler further includes a second GRIN lens inserted and fixed into a third holding tube by applying a fourth heat-curing epoxy. The WDM coupler further includes a fourth holding tube holding a standard single fiber pigtail. To achieve a lowest transmission loss, the single fiber pigtail is disposed at a second optimal position from the second GRIN lens while the first GRIN lens is disposed at a third optimal position from the second GRIN lens. With the first, third and fourth holding tubes being in contact with each other, a fifth heat-curing epoxy is applied to fix the third and fourth holding tubes together and a sixth heat-curing epoxy is applied to fix the first and third holding tubes together.

17 Claims, 4 Drawing Sheets

LOW-COST WAVELENGTH DIVISION MULTIPLEXED (WDM) COUPLER WITH MORE FLEXIBLE AND PRECISE OPTICAL FAITH ADJUSTMENT

FIELD OF THE INVENTION

This invention relates generally to a method and system for use in optical fiber technology. More particularly, this invention relates to a method and system for manufacturing an improved wavelength division multiplexed coupler.

BACKGROUND OF THE INVENTION

In optical fiber technology, wavelength division multiplexed (WDM) couplers are used to combine or separate optical signals having different wavelengths. As the WDM couples are being more broadly applied in the telecommunications, data communications and CATV industries, the fiber optic component industry is now confronted with increasing requirements for WDM couplers with higher level of performance and reliability as well as lower cost.

The performance and reliability of the WDM couplers depend heavily on their design and packaging technologies. Currently, two major kinds of design and packaging technologies are being widely employed in manufacturing the WDM couplers and each kind has its own advantages and disadvantages. In applying a first kind of technology for designing and packaging the WDM couplers, all optical parts are bonded together by applying epoxy bonding. The applications of this first type of WDM couplers show potential reliability risk of epoxy bonding in long-term operation.

FIG. 1A shows the structure of a typical WDM coupler manufactured according to the first kind of design and packaging technology based on epoxy bonding. The WDM coupler includes a dual fiber pigtail 25, a GRIN lens 35, a WDM filter 40, a GRIN lens 50, and a single fiber pigtail 60. In a typical manufacturing process, the GRIN lens 35, the WDM filter 40 and the GRIN lens 50 are first fixed together by applying a heat-curing epoxy 45. The relative position of the GRIN lens 35 to the fiber pigtail 25 is adjusted to achieve a lowest transmission loss from the input fiber 15 to the output fiber 20 for optical signals having reflection wavelengths. Then the dual fiber pigtail 25 is fixed to the GRIN lens 35 by applying a heat-curing epoxy 30. Then the relative position of the GRIN lens 50 to the fiber pigtail 60 is adjusted to achieve a lowest transmission loss from the input fiber 15 to the output fiber 65 for optical signals having transmission wavelengths. And then, the single fiber pigtail 60 is fixed to the GRIN lens 50 by applying a heat-curing epoxy 55. The conventional method and system provides the WDM couplers with good performance and reliability suitable for many types of applications. However, the WDM couplers manufactured according to the conventional method and system have a risk of failure when they are applied in high power optical transmission systems. In general, the heat-curing epoxies inevitably spread over all the optical paths in the WDM couplers. More specifically, the heat-curing epoxies 30, 45 and 55 spread over the optical paths between the dual fiber pigtail 25 and the GRIN lens 35, between the GRIN lenses 35, 50 and the WDM filter 40 and between the GRIN lens 50 and the single fiber pigtail 60, respectively. Under long-term operation, the epoxies 30, 45 and 55 when exposed to the transmitted optical signals may gradually become degraded and susceptible to damages and thus lead to unreliable performance after continuously absorbing the optical signal energy. In the typical WDM coupler, the diameter of the optical signal beam is changing from about 10 m at the epoxy 30 to about 450 m at the epoxy 45 to about 10 m at the epoxy 55. Thus, the optical signal power densities at the epoxies 30 and 55 are about 2500 times higher than that at the epoxy 45. Therefore, the risk for high optical power damage is significantly higher at the epoxies 30 and 55 than at the epoxy 45. The difficulties are specially pronounced for transmission of optical signals of high power. Because of the heat absorption problem, many optical system designers and operators now prefer or even demand to have all optical paths of the WDM couplers epoxy-free. Due to the significantly high power density and thus reliability risk, as the first step toward all epoxy-free optical paths, the optical system designers and operators now require not to use any epoxy on the optical paths between the GRIN lenses and the fiber pigtails. However, by applying the conventional WDM method and system, this epoxy-free optical path requirement can not be easily achieved. Thus, further development of reliable fiber optic components with high level of performance and reliability is limited by these difficulties.

In a pending patent application as shown by FIG. 1B, entitled "Improved Wavelength Division Multiplexed Coupler", filed recently by the present inventor, improvements are achieved for the reliability of the WDM couplers in long-term high-power operation. In the pending application, epoxies are prevented to spread over or diffused into the optical paths between the GRIN lenses 110'160' and the fiber pigtails 135'175' by employing several holding tubes 120'130' and 165'. As a result, the optical paths between the GRIN lenses and the fiber pigtails are epoxy-free. The improved WDM couplers have significantly reduced risk of high optical power damage. Therefore, the improved WDM couplers can be employed in fiber optic components for broadened applications with being much less limited by the reliability problems of the WDM couplers as that encountered in the prior art. Since production costs have been being an important factor in practical implementation of fiber optic technologies, it is highly desirable that production costs would be as low as possible. However, in the pending application, a special single fiber pigtail 175' formed by cutting off one of two fibers of a high-concentricity dual fiber pigtail as that shown by FIG. 1B, is employed. The purpose of the use of the special single fiber pigtail is to obtain the same optical signal outgoing orientation of the single fiber collimator as that of the dual fiber collimator. A difficult arises when the optical signal outgoing orientation of the single fiber collimator is different from that of the dual fiber collimator. Specifically, when aligning the outgoing orientation to achieve a lowest transmission loss, a poor contact between the end surfaces of the holding tubes 120' and 165' will be configured because the holding tubes 120' and 165' must be slightly slanted to adjust for the difference of outgoing orientation angles. Thus the reliability of epoxy bonding between the single and dual collimators is degraded. A specially configured single fiber pigtail is used to resolve this difficulty by cutting off one of the two fibers to form a single fiber pigtail to achieve the same outgoing orientation as a dual fiber pigtail. However, as the high-concentricity dual fiber pigtails are much more expensive compared to standard single fiber pigtails, a high cost is paid for providing this improvement for the WDM couplers. Thus, further development of the WDM couplers must be engaged to lower the improvement cost when it is still limited by these difficulties.

Therefore, a need still exists in the art of design and manufacturing of the WDM couplers to provide improved material compositions, device structure, and manufacturing processes to overcome the difficulties discussed above. Specifically, a technique to provide the WDM couplers with epoxy-free optical paths between the GRIN lenses and the fiber pigtails at lower cost is required.

SUMMARY OF THE PRESENT INVENTION

It is therefore an object of the present invention to provide an improved design and process for fabricating a WDM coupler with improved reliability at lower cost. While the epoxies are prevented to spread over or diffused into the optical paths between the GRIN lenses and the fiber pigtails, the low-cost standard single fiber pigtails are used to replace the expensive special single fiber pigtails. Therefore, the aforementioned difficulties and limitations in the pending application can be overcome.

Specifically, it is an object of the present invention to provide a design and process to fix all optical parts of the WDM couplers together by applying heat-curing epoxies. While several holding tubes are used between the GRIN lenses and the fiber pigtails to prevent the heat-curing epoxies from spreading over or diffused to the optical paths between the GRIN lenses and the fiber pigtails, the low-cost standard single fiber pigtails are employed. A requirement to implement the more expensive special single fiber pigtails is therefore eliminated. As a result, according to the new method and system of the WDM couplers of this invention, the costs are reduced while the optical paths between the GRIN lenses and the fiber pigtails are epoxy-free. The WDM couplers produced according to the presently improved design and process have significantly reduced risk of high optical power damage as well as lower cost. Therefore, the WDM couplers of this invention can be employed in fiber optic components for broadened applications with being much less limited by the reliability and cost problems of the WDM couplers as those encountered in the prior arts.

Briefly, in a preferred embodiment, the present invention discloses a WDM coupler. The WDM coupler includes a WDM filter attached to a first GRIN lens by applying a first heat-curing epoxy. The WDM coupler further includes a first holding tube for holding the first GRIN lens. The first GRIN lens is inserted and fixed in the first holding tube by applying a second heat-curing epoxy. The WDM coupler further includes a second holding tube holding a dual fiber pigtail. The dual fiber pigtail is disposed at a first optimal position from the first GRIN lens to achieve a lowest reflection loss with the first and second holding tubes being in contact with each other. The dual fiber pigtail and the first and second holding tubes are fixed together by applying a third heat-curing epoxy. The WDM coupler further includes a second GRIN lens inserted and fixed into a third holding tube by applying a fourth heat-curing epoxy. The WDM coupler further includes a fourth holding tube holding a standard single fiber pigtail. To achieve a lowest transmission loss, the single fiber pigtail is disposed at a second optimal position from the second GRIN lens while the first GRIN lens is disposed at a third optimal position from the second GRIN lens. With the first, third and fourth holding tubes being in contact with each other, a fifth heat-curing epoxy is applied to fix the third and fourth holding tubes together and a sixth heat-curing epoxy is applied to fix the first and third holding tubes together.

The present invention further discloses a method for fabricating a WDM coupler. The method includes the steps of: a) attaching a WDM filter to a first GRIN lens by applying a first heat-curing epoxy; b) inserting and fixing the first GRIN lens with the WDM filter into a first holding tube having a length slightly longer than the combined length of the first GRIN lens and the WDM filter by applying a second heat-curing epoxy; c) inserting a dual fiber pigtail into a second holding tube then adjusting a relative position between the dual fiber pigtail and the first GRIN lens on an alignment stage to achieve a lowest reflection loss; d) sliding the second holding tube along the dual fiber pigtail without moving the dual fiber pigtail until the first and second holding tubes are in contact then fixing the first and second holding tubes and the dual fiber pigtail together by applying a third heat-curing epoxy; e) inserting and fixing a second GRIN lens into a third holding tube having a length slightly longer than that of the second GRIN lens by applying a fourth heat-curing epoxy; f) inserting a single fiber pigtail into a fourth holding tube; g) mounting the first holding tube with the first GRIN lens and the WDM filter, the third holding tube with the second GRIN lens and the fourth holding tube with the single fiber pigtail on an alignment stage then adjusting relative positions of the first GRIN lens to the second GRIN lens and the single fiber pigtail to the second GRIN lens until a lowest transmission loss is achieved with the first, third and fourth holding tubes being in contact with each other; and h) fixing the third and fourth holding tubes together by applying a fifth heat-curing epoxy and then fixing the first and third holding tubes together by applying a sixth heat-curing epoxy.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

The present invention discloses a WDM coupler that includes major parts of the fiber pigtails, the GRIN lenses and the WDM filter. These parts are fixed together by applying heat-curing epoxies. While the epoxies employed for bonding are prevented by employing holding tubes from spreading over the optical paths between the GRIN lenses and the fiber pigtails, standard single fiber pigtails are employed to reduce costs.

Figure 2A:
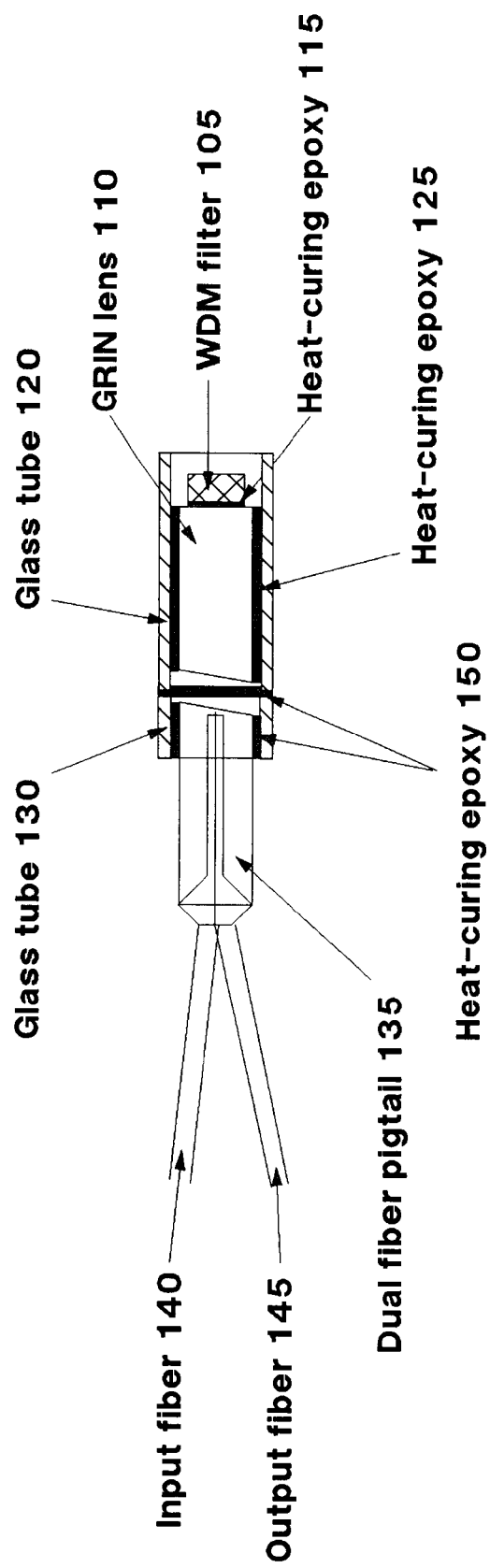
FIGS. 2A to 2B are cross sectional view of the WDM coupler for illustrating the fabrication steps for making a WDM coupler of this invention.
Figure 2B:
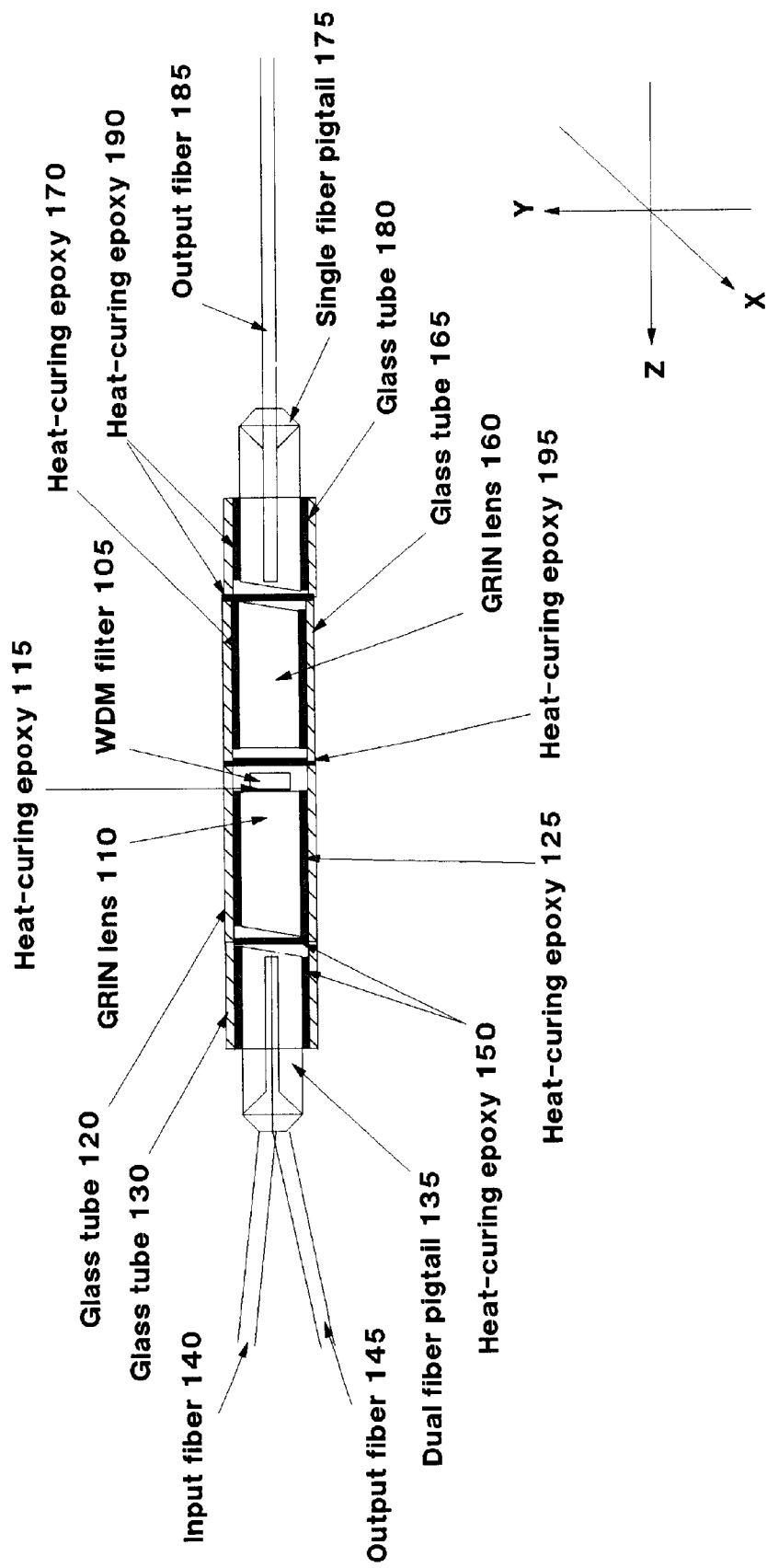

Please refer to FIGS. 2A to 2B for discussion of the materials and the fabrication processes employed to provide an improved WDM coupler 100 of this invention. In FIG. 2A, a WDM filter 105 is attached to a first GRIN lens 110 by applying a first heat-curing epoxy 115. The epoxy 115 will enter the interface between the WDM filter 105 and the first GRIN lens 110 and thus provides a very reliable bonding with good humidity resistance. Then the first GRIN lens 110 with the WDM filter 105 is inserted and fixed into a first holding tube 120 having a length slightly longer than the combined length of the WDM filter 105 and the first GRIN lens 110 by applying a second heat-curing epoxy 125.

After a second holding tube 130 is mounted onto a dual fiber pigtail 135, the filter 105/lens 110/tube 120 sub-assembly and the fiber pigtail 135 with the holding tube 130 are mounted on an alignment stage (not shown). Then a distance and orientation of the fiber pigtail 135 relative to the GRIN lens 110 is adjusted to achieve a lowest reflection loss from the input fiber 140 to the output fiber 145. After the fiber pigtail 135 is placed at its optimal position relative to the GRIN lens 110, the position of the holding tube 130 is adjusted so that its end surface is in contact with that of the holding tube 120. Then a third heat-curing epoxy 150 is applied to fix the fiber pigtail 135 and the two holding tubes 120 and 130 together and thus an assembly of a dual fiber collimator 155 is completed. After the epoxy 150 is applied, it will spread over all contact areas between the holding tube 130 and the fiber pigtail 135 and between the holding tubes 120 and 130. However, it will not contaminate the optical path between the GRIN lens 110 and the fiber pigtail 135 because of surface tension.

Referring now to FIG. 2B, a second GRIN lens 160 is inserted and fixed into a third holding tube 165 having a length slightly longer than that of the GRIN lens 160 by applying a fourth heat-curing epoxy 170. Then a single fiber pigtail 175 is inserted into a fourth holding tube 180. The single fiber pigtail 175 is a low-cost standard single fiber pigtail, unlike that made from a high-concentricity dual fiber pigtail by cutting off one of the two fibers. Then the first holding tube 120 with the first GRIN lens 110 and the WDM filter 105, the third holding tube 165 with the second GRIN lens 160 and the fourth holding tube 180 with the single fiber pigtail 175 are mounted on an alignment stage (not shown). A pigtail position-adjustment is made on the alignment stage to achieve optimal positions of the first GRIN lens 110 to the second GRIN lens 160 and the single fiber pigtail 175 to the second GRIN lens 160 with a lowest transmission loss.

Figure 1A:
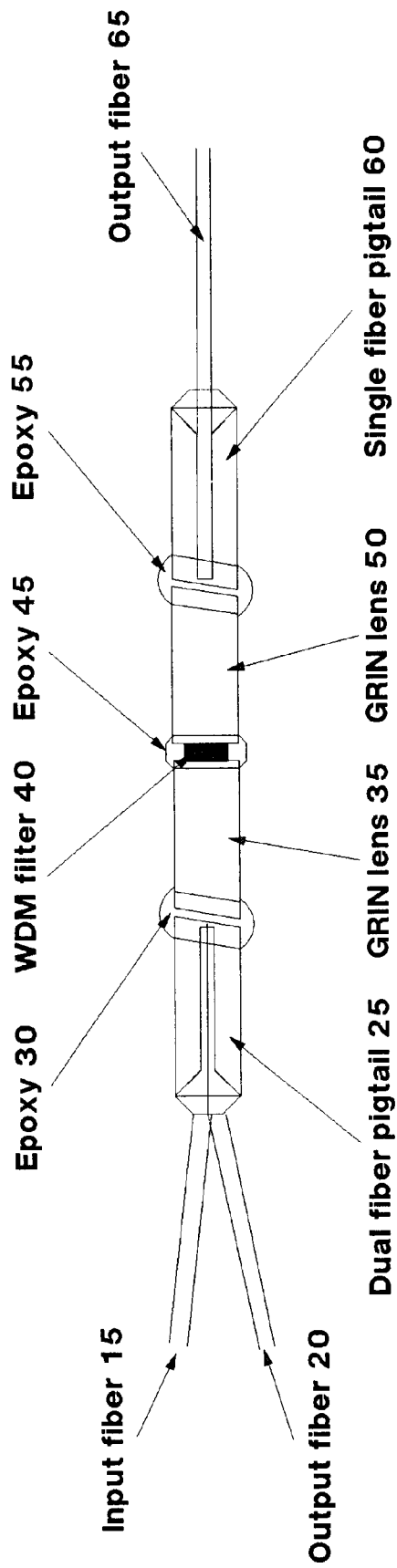
FIG. 1A is a cross sectional view of the WDM coupler made according to the conventional design and packaging technology.
Figure 1B:
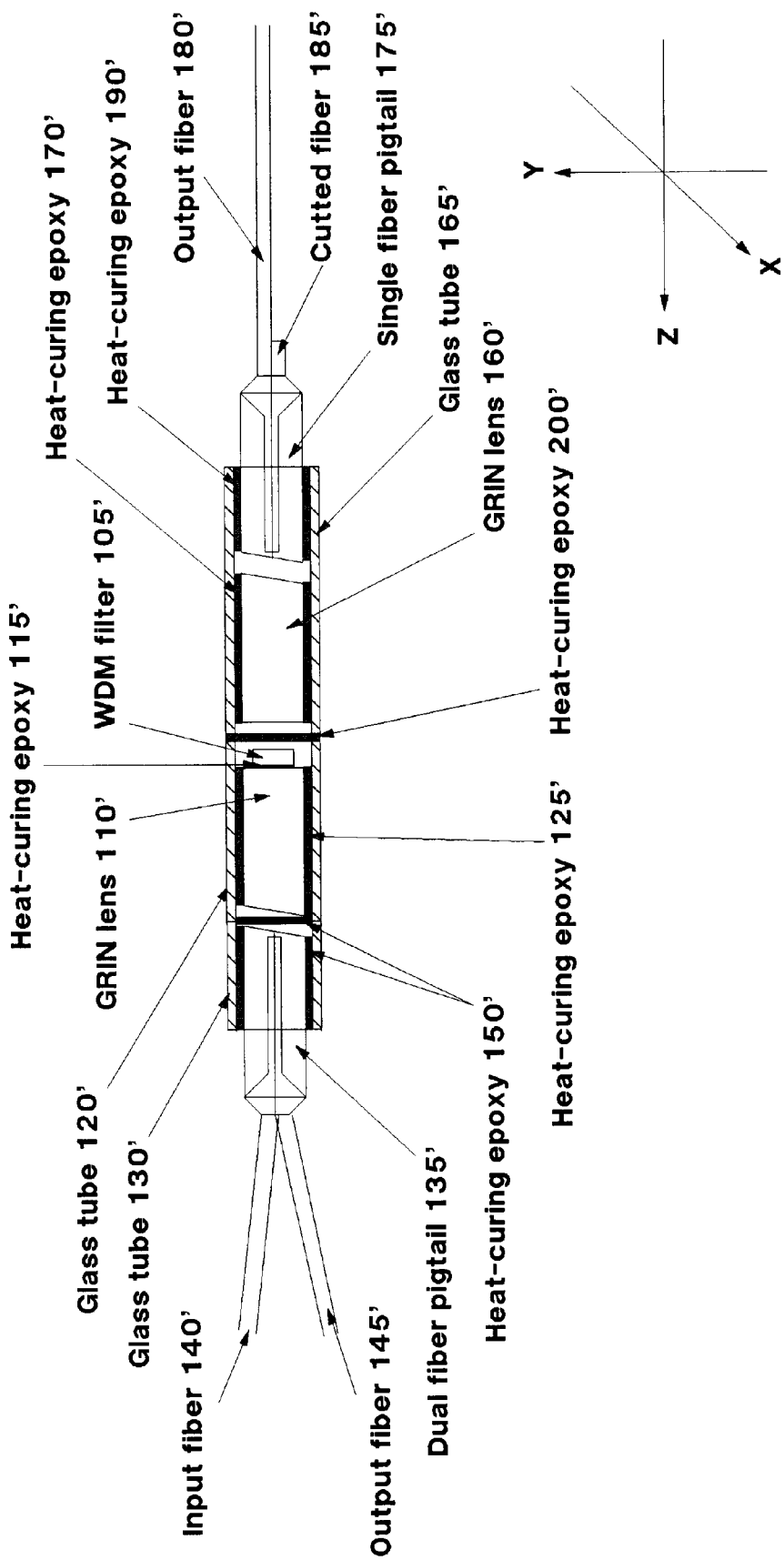
FIG. 1B is a cross sectional view of the WDM coupler made according to the previously improved design and packaging technology.

With this unique and novel configuration, the process of the position adjustment of the single fiber pigtail 175 is provided with greater degree of flexibility. In the pending patent application as shown in FIG. 1B, the single fiber pigtail 175' is allowed to move only in the Z-direction for focusing adjustment. For that reason, a special single fiber pigtail 175' has to be used by cutting off a fiber from a dual fiber pigtail to obtain the same outgoing orientation of the single fiber collimator as that of the dual fiber collimator. The outgoing orientation angle of the single fiber collimator cannot be adjusted because the single fiber pigtail 175' cannot be adjusted in the X-Y directions due to limitation from the holding tube 165'. In the present invention as shown in FIG. 2B, the fourth holding tube 180 that can be moved in all three dimensions without limitations now holds the single fiber pigtail 175. The outgoing orientation of the single fiber collimator is adjusted by moving the fourth holding tube 180 holding the single fiber pigtail 175 in all X-Y-Z directions until optimal focus and orientation angle-alignment are achieved. For the purpose of outgoing-orientation alignment, the fourth holding tube 180 is adjusted to be slightly lower, e.g., by a small distance of less than 0.1 mm, than the third holding tube 165. Since the thickness of the holding tube 180 is about 0.4 to 0.8 mm, the small distance adjustment of the fourth holding tube 180 relative to the third holding tube 160 would not affect the bonding strength by the heat curing epoxy 190. The process of securely bonding the fourth holding tube 180 to the third holding tube 165 will be further discussed below.

On the alignment stage, the first holding tube 120 is in physical contact with the third holding tube 165 and the third holding tube 165 is in physical contact with the fourth holding tubes 180. A fifth heat-curing epoxy 190 is applied to fix the fiber pigtail 175 and the third and fourth holding tubes 165 and 180 together. Then, a sixth heat-curing epoxy 195 is applied to fix the first and third holding tubes 120 and 165 together. The epoxy 190 will permeate the whole contact areas between the single fiber pigtail 175 and the fourth holding tube 180 and between the third and fourth tubes 160 and 180. Also, the epoxy 195 will permeate the whole contact areas between the first and third holding tubes 120 and 165. By assembling a WDM coupler according to the above method and system, two GRIN lenses of 0.23 pitch are implemented as the first GRIN lens 110 and the second GRIN lens 160. The use of 0.23-pitch GRIN lenses is to provide an optimal gap of about 0.2 mm between the GRIN lenses and the fiber pigtails, which will prevent heat-curing epoxies from entering the optical paths between the GRIN lenses and the fiber pigtails due to surface tension.

As discussed above, according to the previously improved method and system as shown by FIG. 1B, only the relative longitudinal position between the second GRIN lens 160' and the single fiber pigtail 175' can be precisely adjusted. A specially configured single fiber pigtail 175' formed by cutting off one of the two fibers of a high-concentricity dual fiber pigtail is needed. By using this specially configured single fiber pigtail 175'the same optical signal outgoing orientation of the single fiber collimator as that of the dual fiber collimator is achieved. In contrast, with the above method and system of this invention, both the longitudinal and lateral positions between the second GRIN lens 160 and the single fiber pigtail 175 can be precisely adjusted. Thus, the standard single fiber pigtail 175 in the above method and system can work just like the special single fiber pigtail 175 in the previously improved method and system as shown by FIG. 1B. Thus the costs of the WDM couplers of this invention are reduced.

In the present invention, the lengths of the holding tubes 120, 130, 165 and 180 are chosen as about 5.7 mm, 3 mm, 4.7 mm and 3 mm, respectively. The inside diameters of the holding tubes 120, 130, 165 and 180 are chosen to match with those of the GRIN lenses 110, 160 and the fiber pigtails 135, 175., i.e., 1.8 mm. The outside diameters of the holding tubes 120, 130, 165 and 180 are chosen as about 2.8 mm. In a preferred embodiment, the first, second, third and fourth holding tubes are preferably glass tubes which have about the same thermal expansion coefficients as the GRIN lenses and the fiber pigtails. In a preferred embodiment, the first, second, third, fourth, fifth and sixth heat-curing epoxies are preferably a 353ND heat-curing epoxy from Epoxy Technology Inc. located in Billerica, Massachusetts because it has very good glass-to-glass bonding strength, thermal stability and humidity reliability.

According to FIGS. 2A to 2B and the above description, this present invention discloses a WDM coupler. The WDM coupler includes a dual fiber collimator that includes a GRIN lens with a WDM filter held in a first holding tube and a dual fiber pigtail held in a second holding tube. The WDM coupler further includes a single fiber collimator that includes a GRIN lens held in a third holding tube and a single fiber pigtail held in a fourth holding tube. The first holding tube and second holding tube are in contact and bonded with an epoxy and the fourth holding tube disposed at a slightly different vertical position from the third holding tube to achieve an aligned outgoing orientation between the single fiber pigtail and the dual fiber collimator. In a preferred embodiment, the fourth holding tube is disposed slightly below the third holding tube. In another preferred embodiment, the first, second, third and fourth holding tubes are glass holding-tubes. In another preferred embodiment, the epoxy is a heat-curing epoxy.

In summary, this invention discloses an optical device includes a plurality of optical parts for processing an optical signal transmission therein. The device includes a plurality of gaps each having an adjusted distance between the plurality of optical parts. The device further includes two holding tubes holding two of the plurality of optical parts and the holding tubes are in contact with each other in at least one of the gaps. At least one of the holding tubes is arranged to having a slightly different vertical position than other hold tubes for outgoing orientation alignment. The device further includes an epoxy applied over contact area between two of the holding tubes over one of the gaps for securely bonding the holding tubes holding the plurality of optical parts. In a preferred embodiment, the holding tubes over at least one of the gaps between the optical parts are glass holding-tubes. In a preferred embodiment, the epoxy applied over the contact area between two of the holding tubes over one of the gaps for securely bonding the holding tubes holding the plurality of optical parts is a heat-curing epoxy.

According to FIGS. 2A to 2B and the above descriptions, this invention discloses a method for fabricating a WDM coupler. The method includes the steps of: a) attaching a WDM filter to a first GRIN lens by applying a first heat-curing epoxy; b) inserting and fixing the first GRIN lens with the WDM filter into a first holding tube having a length slightly longer than the combined length of the first GRIN lens and the WDM filter by applying a second heat-curing epoxy; c) inserting a dual fiber pigtail into a second holding tube then adjusting a relative position between the dual fiber pigtail and the first GRIN lens on an alignment stage to achieve a lowest reflection loss; d) sliding the second holding tube along the dual fiber pigtail without moving the dual fiber pigtail until the first and second holding tubes are in contact then fixing the first and second holding tubes and the dual fiber pigtail together by applying a third heat-curing epoxy; e) inserting and fixing a second GRIN lens into a third holding tube having a length slight longer than that of the second GRIN lens by applying a fourth heat-curing epoxy; f) inserting a single fiber pigtail into a fourth holding tube; g) mounting the first holding tube with the first GRIN lens attached to the WDM filter, the third holding tube with the second GRIN lens and the fourth holding tube holding the single fiber pigtail on an alignment stage; h) adjusting relative positions of the first GRIN lens to the second GRIN lens, and the single fiber pigtail to the second GRIN lens to achieve a lowest transmission loss with the first, third and fourth holding tubes being in contact with each other; i) applying a fifth heat-curing epoxy for securely bonding the single fiber pigtail to the fourth holding tube and bonding the fourth holding tube to the third holding tube; and j) applying a sixth heat-curing epoxy for securely bonding the third holding tube holding the second GRIN lens to the first holding tube holding the first GRIN lens with end surfaces in close contact.

Therefore, the present invention discloses a new design and process for fabricating a WDM coupler with improved reliability at lower cost. The difficulties and limitations in the prior arts are in large part overcome. Specifically, this invention discloses a fabrication process to fix the WDM couplers by applying heat-curing epoxies to produce the WDM couplers with better reliability in long-term high power operation at lower cost. While holding tubes are used between the fiber pigtails and the GRIN lenses to prevent the heat-curing epoxies from spreading over the optical paths between the GRIN lenses and the fiber pigtails, standard single fiber pigtails are used to reduce costs. Therefore, the improved WDM couplers can be employed in fiber optic components for broaden applications.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An optical device includes a plurality of optical parts for processing an optical signal transmission therein, comprising:

a plurality of gaps each having an adjusted distance between said plurality of optical parts;

two holding tubes holding two of said plurality of optical parts and said holding tubes are in contact with each other in at least one of said gaps;

at least one of said holding tubes is arranged to dispose at a slightly different vertical position than other holding tubes for aligning with an outgoing orientation of said optical signal transmission;

an epoxy applied over a contact area between two of said holding tubes over one of said gaps for securely bonding said holding tubes and said plurality of optical parts;

a WDM coupler wherein said WDM coupler further comprising:

a first GRIN lens attached to a WDM filter via a first epoxy;

a first holding tube holding and securely bonding to said first GRIN lens with a second epoxy;

a dual optical fiber pigtail disposed at a first optimal gap from said first GRIN lens to achieve a lowest transmission loss;

a second holding tube holding and securely bonding to said dual optical fiber pigtail with a third epoxy and said first and second holding tubes being further securely bonding to each other with a fourth epoxy for maintaining said optimal gap between said first GRIN lens and said dual fiber pigtail;

a third holding tube holding and bonding to a second GRIN lens with a fifth epoxy;

a fourth holding tube holding a single fiber pigtail disposed at a second optimal distance from said second GRIN lens said fourth tube securely boding to said single fiber pigtail and to said third holding tube with a sixth epoxy for maintaining said second optimal distance; and said first holding tube holding said first GRIN length in physical contact and securely boding to said third holding tube holding said second GRIN lens with a seventh epoxy wherein said WDM filter is aligned with said second GRIN lens and said single and dual fiber pigtails having aligned outgoing orientation.

2. The optical device of claim 1 wherein:

said first, second, third, fourth, fifth, sixth and seventh epoxies are a 353ND epoxy.

3. The optical device of claim 1 wherein:

said first and second holding tubes are a first and a second glass tubes.

4. The optical device of claim 1 wherein:

said first and second holding tubes are a first and second holding tubes having a length ranging from 3.0 to 6.5 mm with an inside diameter of about 1.8 mm and an outside diameter of about 2.8 mm.

5. The optical device of claim 1 wherein:

said third and fourth holding tube are glass tubes.

6. The optical device of claim 1 wherein:

said third holding tube is a holding tube having a length of about 4.0 to 5.5 mm and said fourth holding tube having a length ranging from 2.5 to 3.5 mm and said third and fourth holding tubes having an inside diameter of about 1.8 mm and an outside diameter of about 2.8 mm.

7. The optical device of claim 1 wherein:

said first and said second GRIN lens are GRIN lenses of 0.23 pitch.

8. The optical device of claim 1 wherein:

said fourth holding tube holding said single fiber pigtail is arranged slightly lower than said third holding tube for achieving an aligned outgoing orientation with said dual fiber pigtail.

9. An optical device includes a plurality of optical parts for processing an optical signal transmission therein, comprising:

a plurality of gaps each having an adjusted distance between said plurality of optical parts;

two holding tubes holding two of said plurality of optical parts and said holding tubes are in contact with each other in at least one of said gaps;

at least one of said holding tubes is arranged to dispose at a slightly different vertical position than other holding tubes for aligning with an outgoing orientation of said optical signal transmission; and an epoxy applied over a contact area between two of said holding tubes over one of said gaps for securely bonding said holding tubes and said plurality of optical parts.

10. The optical device of claim 9 wherein:

said holding tubes over at least one of said gaps between said optical parts are glass holding tubes.

11. The optical device of claim 9 wherein:

said epoxy applied over said contact area between two of said holding tubes over one of said gaps for securely bonding said holding tubes holding said plurality of optical parts are heat-curing epoxies.

12. The optical device of claim 11 wherein:

said heat-curing epoxies are heat-curing epoxies of 353ND epoxies.

13. The optical device of claim 9 wherein:

one of said optical parts is a dual fiber pigtail and one of said optical parts is a single fiber pigtail wherein said single and dual fiber pigtails having an aligned outgoing orientation.

14. An optical device includes a plurality of optical parts for processing an optical signal transmission therein, comprising:

a plurality of gaps each having an adjusted distance between said plurality of optical parts;

two holding tubes holding two of said plurality of optical parts and said holding tubes are in contact with each other in at least one of said gaps;

at least one of said holding tubes is arranged to dispose at a slightly different vertical position than other holding tubes for aligning with an outgoing orientation of said optical signal transmission;

an epoxy applied over a contact area between two of said holding tubes over one of said gaps for securely bonding said holding tubes and said plurality of optical parts;

a WDM coupler wherein said WDM coupler further comprising:

a dual fiber collimator held in a first holding tube; and a single fiber collimator includes a GRIN lens held in a second holding tube and a single fiber pigtail held in a third holding tube wherein said first holding tube and second holding tube are in contact and bonded with an epoxy and said third holding tube disposed at a slightly different vertical position from said second holding tube to achieve an aligned outgoing orientation between said single fiber pigtail and said dual fiber collimator.

15. The optical device of claim 14 wherein:

said third holding tube is disposed slightly below said second holding tube.

16. The optical device of claim 14 wherein:

said first, second and third holding tubes are glass holding tubes.

17. The optical device of claim 14 wherein:

said epoxy is a heat-curing epoxy.

\* \* \* \* \*